(12) United States Patent
Fitch et al.

(10) Patent No.: US 11,546,819 B2
(45) Date of Patent: Jan. 3, 2023

(54) CELLULAR TELECOMMUNICATIONS NETWORK

(71) Applicant: BRITISH TELECOMMUNICATIONS PUBLIC LIMITED COMPANY, London (GB)

(72) Inventors: Michael Fitch, London (GB); Richard Mackenzie, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/250,696

(22) PCT Filed: Jul. 4, 2019

(86) PCT No.: PCT/EP2019/067971
§ 371 (c)(1),
(2) Date: Feb. 19, 2021

(87) PCT Pub. No.: WO2020/038643
PCT Pub. Date: Feb. 27, 2020

(65) Prior Publication Data
US 2021/0204185 A1    Jul. 1, 2021

(30) Foreign Application Priority Data

Aug. 23, 2018    (EP) ..................................... 18190557

(51) Int. Cl.
*H04W 4/00*    (2018.01)
*H04W 36/08*    (2009.01)
(Continued)

(52) U.S. Cl.
CPC ........... *H04W 36/08* (2013.01); *H04W 36/30* (2013.01); *H04W 36/32* (2013.01); *H04W 84/005* (2013.01)

(58) Field of Classification Search
CPC ..... H04W 36/08; H04W 36/30; H04W 36/32; H04W 84/005; H04W 88/085
(Continued)

(56) References Cited

U.S. PATENT DOCUMENTS 5,384,824 A    1/1995    Alvesalo
6,324,405 B1    11/2001    Young et al.
(Continued)

FOREIGN PATENT DOCUMENTS

CN    104303577 B    6/2018
CN    104067688 B    8/2018
(Continued)

OTHER PUBLICATIONS

3GPP TR 38.801 V14.0.0 "3rd Generation Partnership Project; Technical Specification Group Radio Access Network; Study on New Radio Access Technology: Radio Access Architecture and Interfaces (Release 14)," Mobile Competence Centre, 2017, pp. 1-91.

(Continued)

*Primary Examiner* — Amancio Gonzalez
(74) *Attorney, Agent, or Firm* — Patterson Thuente, P.A.

(57) ABSTRACT

The invention relates to a method in a cellular telecommunications network, the method including discovering a second donor base station having a first interface for communicating with the first central base station unit and a second interface for wirelessly communicating with the distributed base station unit; determining a capacity of a connection between the central base station unit and the distributed base station unit via the second donor base station; determining that the capacity of the connection satisfies a functional split threshold; and, in response to this determination, causing the centralized base station unit and the distributed base station unit to implement a second functional split in which a third (Continued)

set of protocol functions are implemented in the distributed base station unit and a fourth set of protocol functions are implemented in the central base station unit; and initiating a handover of the distributed base station unit from the first donor base station to the second donor base station.

11 Claims, 9 Drawing Sheets

(51) Int. Cl.
  H04W 36/30    (2009.01)
  H04W 36/32    (2009.01)
  H04W 84/00    (2009.01)
(58) Field of Classification Search
  USPC .......................................................... 370/331
  See application file for complete search history.

(56) References Cited

U.S. PATENT DOCUMENTS

| | | | |
|---|---|---|---|
| 7,400,901 | B2 | 7/2008 | Kostic et al. |
| 8,731,563 | B2 | 5/2014 | Yi |
| 8,897,264 | B2 * | 11/2014 | Samdanis ............... H04B 7/155 |
| | | | 455/436 |
| 8,897,788 | B2 | 11/2014 | Ruuska |
| 9,042,258 | B2 | 5/2015 | Jung et al. |
| 9,282,528 | B2 | 3/2016 | Hashimoto |
| 9,432,991 | B2 * | 8/2016 | Khandekar ............. H04L 5/005 |
| 9,479,981 | B2 | 10/2016 | Dimou et al. |
| 9,510,206 | B2 | 11/2016 | Liu et al. |
| 9,814,021 | B2 | 11/2017 | Himayat et al. |
| 9,883,431 | B2 | 1/2018 | Venkatraman et al. |
| 10,219,165 | B2 | 2/2019 | Futaki |
| 11,019,547 | B1 * | 5/2021 | Oroskar .......... H04W 36/00837 |
| 11,184,869 | B2 * | 11/2021 | Abedini ............ H04W 56/0015 |
| 11,240,780 | B2 * | 2/2022 | Park .................. H04W 74/0833 |
| 2012/0218886 | A1 * | 8/2012 | Van Phan .......... H04W 72/1252 |
| | | | 370/315 |
| 2013/0021929 | A1 | 1/2013 | Kim |
| 2013/0157676 | A1 | 6/2013 | Baek et al. |
| 2014/0056243 | A1 | 2/2014 | Pelletier et al. |
| 2014/0071884 | A1 | 3/2014 | Sherman |
| 2014/0135031 | A1 | 5/2014 | Weiguo |
| 2014/0220963 | A1 | 8/2014 | Jung et al. |
| 2014/0269322 | A1 | 9/2014 | Li et al. |
| 2016/0174241 | A1 | 6/2016 | Ansari et al. |
| 2016/0219475 | A1 | 7/2016 | Kim |
| 2016/0262163 | A1 | 9/2016 | Gonzalez Garrido et al. |
| 2017/0111831 | A1 | 4/2017 | Xiao et al. |
| 2017/0310437 | A1 | 10/2017 | Bottari et al. |
| 2018/0076877 | A1 * | 3/2018 | Liu .................... H04B 7/15507 |
| 2018/0115990 | A1 * | 4/2018 | Abedini ................ H04L 5/0053 |
| 2018/0234882 | A1 | 8/2018 | Cho et al. |
| 2018/0241452 | A1 * | 8/2018 | Akkarakaran .......... H04L 5/005 |
| 2018/0255507 | A1 | 9/2018 | Nagasaka et al. |
| 2018/0270894 | A1 | 9/2018 | Park et al. |
| 2018/0324780 | A1 | 11/2018 | Novlan et al. |
| 2018/0337846 | A1 | 11/2018 | Lee et al. |
| 2019/0028174 | A1 * | 1/2019 | Chakraborty ....... H04L 27/2692 |
| 2019/0074882 | A1 * | 3/2019 | Zhou .................. H04W 52/146 |
| 2019/0230697 | A1 | 7/2019 | Yang et al. |
| 2019/0289478 | A1 | 9/2019 | Hosseini et al. |
| 2019/0296882 | A1 | 9/2019 | Li et al. |
| 2019/0312713 | A1 | 10/2019 | Yang et al. |
| 2019/0394738 | A1 * | 12/2019 | Abedini ............. H04W 74/0833 |
| 2021/0168671 | A1 * | 6/2021 | Hong .............. H04W 36/00837 |
| 2021/0227435 | A1 * | 7/2021 | Hsieh ................ H04W 36/0055 |
| 2022/0052804 | A1 | 2/2022 | Mackenzie |

FOREIGN PATENT DOCUMENTS

| | | |
|---|---|---|
| CN | 105103598 B | 2/2019 |
| CN | 107135055 B | 6/2020 |
| EP | 2753143 A1 | 7/2014 |
| EP | 2924924 A1 | 9/2015 |
| EP | 3113532 A1 | 1/2017 |
| EP | 3363259 A1 | 8/2018 |
| ES | 2718906 T3 | 7/2019 |
| GB | 2552844 A | 2/2018 |
| JP | 2018524920 A | 8/2018 |
| JP | 2018142940 A | 9/2018 |
| KR | 20150022240 A | 3/2015 |
| KR | 101533852 B1 | 7/2015 |
| RU | 2561859 C2 | 9/2015 |
| WO | WO-2015093559 A1 | 6/2015 |
| WO | WO-2017197063 A1 | 11/2017 |
| WO | WO-2018012873 A1 | 1/2018 |
| WO | WO-2018030819 A1 | 2/2018 |
| WO | WO-2018089803 A1 | 5/2018 |
| WO | WO-2020057952 A1 | 3/2020 |

OTHER PUBLICATIONS

3GPP TR 38.801 V2.0.0 "3rd Generation Partnership Project; Technical Specification Group Radio Access Network; Study on New Radio Access Technology: Radio Access Architecture and Interfaces (Release 14)," 2017, pp. 1-90.

3GPP TS 38.401 V15.2.0, "3rd Generation Partnership Project; Technical Specification Group Radio Access Network; NG-RAN; Architecture description (Release 15)," 650 Route des Lucioles—Sophia Antipolis, Jun. 2018, 39 pages.

3GPPT 38.801 V14.0.0, "3rd Generation Partnership Project; Technical Specification Group Radio Access Network; Study on new radio access technology: Radio access architecture and interfaces (Release 14)," (Mar. 2017), 84 pages.

Asensio A., et al., "Dynamic Virtual Network Connectivity Services to Support C-RAN Backhauling," Journal of Optical Communications and Networking, vol. 8 (12), Dec. 2016, pp. B93-B103.

Boulos K., et al., "Interference-Aware Clustering in Cloud Radio Access Networks," IEEE International Conference on Cloud Networking, Sep. 2017, 6 pages.

Catt, "Analysis on Fronthaul Split Options," R2-162570, 3GPP TSGRAN WG2 Meeting #93bis, Agenda Item 9.5.1, Mobile Competence Centre, Apr. 2016, pp. 1-5.

Combined Search and Examination Report under Sections 17 and 18(3) for Great Britain Application No. 1815378.3, dated Mar. 4, 2019, 5 pages.

Extended European Search Report for Application No. 18195908.1, dated Nov. 28, 2018, 11 pages.

Extended European Search Report for Application No. 18195909.9, dated Jan. 16, 2019, 14 pages.

Extended European Search Report for Application No. 19195268.8, dated Oct. 1, 2019, 12 pages.

Extended European Search Report for EP Application No. 18190557.1, dated Mar. 1, 2019, 10 pages.

Giannone F., et al., "Impact of RAN Virtualization on Fronthaul Latency Budget: An Experimental Evaluation," IEEE Globecom Workshops, Nov. 2, 2017, 6 pages.

Harutyunyan D., et al., "Flexible Functional Split in 5G Networks," 2017, 9 pages.

NGMN, "NGMN Overview on 5G RAN Functional Decomposition," NGMN Alliance, Version. 1.0, Feb. 2018, 48 pages.

Notification of Transmittal of the International Search Report and Written Opinion of the International Searching Authority for Application No. PCT/EP2019/067971, dated Aug. 20, 2019, 14 pages.

Notification of Transmittal of the International Search Report and Written Opinion of the International Searching Authority for Application No. PCT/EP2019/073331, dated Sep. 25, 2019, 18 pages.

Office Action for GB Application No. 1912675.4, dated Feb. 7, 2020, 4 pages.

Samsung., "F1AP Function Definition and Categorization," R3-172246, 3GPP TSG-RAN WG3 Meeting Ad Hoc, Mobile Competence Centre, Jun. 2017, 16 pages.

Search Report for GB Application No. 1813777.8, dated Feb. 26, 2019, 5 pages.

(56) References Cited

OTHER PUBLICATIONS

Search Report under Section 17 for Great Britain Application No. 1815377.5, dated Mar. 12, 2019, 4 pages.
Valastro G.C., et al., "A SDN/NFV Based C-RAN Architecture for 5G Mobile Networks," IEEE, International Conference on Selected Topics in Mobile and Wireless Networking, XP033383120, Jun. 2018, 8 pages.
Written Opinion for Application No. PCT/EP2019/073331, dated Sep. 11, 2020, 9 pages.
Chang C Y., et al., "FlexCRAN: A flexible Functional Split Framework over Ethernet fronthaul in Cloud-RAN," 2017, IEEE International Conference on Communications, 7 pages.
Examination Report for Indian Application No. 202117007647, dated May 25, 2022, 5 pages.
Examination Report for Indian Application No. 202117016292, dated Feb. 14, 2022, 7 pages.
Intel: "Fronthaul and RAN Functional Split Aspects of the Next Generation Radio Access Network," 3GPP TSG-RAN WG2#91bis, R3-160622, Retrieved from the Internet:URL:http://www.3gpp.org/ftp/tsg_ran/WG2_RL2/TSGR2_93bis/Docs/R2-162713.zip, Apr. 15, 2016, 6 Pages.
Intel, "Fronthaul and RAN functional split aspects of the next generation radio access network," 3GPP TSG-RAN WG2#93bis, R2-162713, Intel Corporation, Retrieved from the Internet:URL:http://www.3gpp.org/ftp/tsg_ran/WG2_RL2/TSGR2_93bis/Docs/R2-162713.zip, pages, Apr. 15, 2016, 6 Pages.
International Preliminary Report on Patentability for Application No. PCT/EP2019/073331, dated Mar. 9, 2021, 21 pages.
NTT Docomo, Inc., "Presentation of Report to TSG: TR38.801, Version 2.0.0; Study on New Radio Access Technology; Radio Access Architecture and Interfaces," 3GPP TSG RAN #75 RP-170490, Mar. 6, 2017, 14 pages.
Office Action For GB Application No. 1815378.3, dated Nov. 17, 2020, 2 pages.
Office action for Japanese Application No. 2021510035, dated Mar. 22, 2022, 7 pages.
Office Action for Japanese Application No. 2021-515526, dated May 24, 2022, 4 pages.
Telecom Infra Project, "Creating an Ecosystem for vRANs Supporting Non-ideal Fronthaul," 2018, 22 pages.
Umesh A., et al., "Standardization Trends for Open and Intelligent Wireless Access Networks," NTT DOCOMO Technical Journal, vol. 27(1), Telecommunications Association, pp. 43-55.
Wang J., et al., "Distributed Antenna Systems for Mobile Communications in High Speed Trains," IEEE Journal on Selected Areas in Communications, May 2012, vol. 30, No. 4, 99. pp. 675-683.
xRAN Resources, xRAN Fronthaul Control, User and Synchronization Plan Specification Version 2.0 and XRAN Fronthaul Management Plane Specification Version 1.0, https://link.edgepilot.com/s/0072863d/7hupfmBTwkaKtq09Bdxl2w?u=http://www.xran.org/resources/.

\* cited by examiner

Figure 4a
Time $t_1$

Figure 4b
Time t₂

Figure 4c
Time $t_3$

Figure 4d
Time $t_3$

CELLULAR TELECOMMUNICATIONS NETWORK

PRIORITY CLAIM

The present application is a National Phase entry of PCT Application No. PCT/EP2019/067971, filed Jul. 4, 2019, which claims priority from EP Patent Application No. 18190557.1, filed Aug. 23, 2018, each of which is hereby fully incorporated herein by reference.

TECHNICAL FIELD

The present disclosure relates to a mobile base station in a cellular telecommunications network.

BACKGROUND

Cellular telecommunications networks typically comprise a plurality of base stations which each have a coverage area for communicating with a plurality of User Equipment (UE). Traditionally, a base station is in a fixed geographical location by being installed at a particular site or by being installed on a building. These fixed base stations utilize local (typically wired) power and data communication interfaces to receive electrical power and to connect to a cellular core network (often known as a backhaul).

Modern cellular telecommunications networks also provide mobile base stations. These mobile base stations are of a non-fixed geographical location and may change their location either by self-powered movement or by being installed on a movable vehicle (e.g. a train or car). The mobile base station also has a coverage area for communicating with a plurality of UEs, which is achieved in the same manner as for fixed base stations. The mobile base station's backhaul may be provided by a wired interface, but in many circumstances such wired interfaces are unsuitable. Accordingly, mobile base stations typically have a wireless communications interface for carrying backhaul traffic. These wireless communications interfaces connect to a "donor" base station, and the donor base station's backhaul connection to the cellular core network includes both traffic for its own UEs and traffic for the mobile base station's UEs.

As the mobile base station may move relative to the fixed base stations, such that it may move out of a coverage area of its "serving" donor base station, cellular networking protocols define a handover process such that the mobile base station may disconnect from its serving donor base station and connect to a target donor base station with minimal disruption. This process mirrors the corresponding process for UE handover between a serving and target base station, and the mobile base station therefore includes a subset of UE functionality to support this process.

Modern cellular networks also support centralized radio access network architectures in which a base station may be split into a central unit and a distributed unit. The central unit interconnects a core cellular network with a plurality of distributed units, and the plurality of distributed units each communicate with a plurality of UEs. The various protocol layers of the cellular protocol in use are split between the central and distributed units such that the distributed units implement the lowest layer and optionally one or more higher layers, and all other higher layers are implemented in the central unit. This has the benefit that the central unit may coordinate communications of multiple distributed units to maximize Quality of Service. Generally, a lower protocol split (e.g. layer 1/2) will have greater coordination than a higher protocol split (e.g. layer 3/4), but will require a higher capacity link between the central and distributed units.

SUMMARY

According to a first aspect of the disclosure, there is provided a method in a cellular telecommunications network, the cellular telecommunications network including a central base station unit, a first donor base station and a distributed base station unit, the central base station unit having a first interface for communicating with a first cellular core networking node and a second interface for communicating with the first donor base station, the first donor base station having a first interface for communicating with the central base station unit and a second interface for wirelessly communicating with the distributed base station unit, the distributed base station unit being mobile and having a first interface for wirelessly communicating with the first donor base station and a second interface for communicating with a User Equipment, UE, wherein the UE's user traffic is transmitted between the central base station unit and the UE via the first donor base station and the distributed base station unit, wherein the central base station unit and distributed base station unit implement a first functional split in which a first set of protocol functions are implemented in the distributed base station unit and a second set of protocol functions are implemented in the central unit, the method comprising: discovering a second donor base station having a first interface for communicating with the first central base station unit and a second interface for wirelessly communicating with the distributed base station unit; determining a capacity of a connection between the central base station unit and the distributed base station unit via the second donor base station; determining that the capacity of the connection satisfies a functional split threshold; and, in response to this determination, causing the centralized base station unit and the distributed base station unit to implement a second functional split in which a third set of protocol functions are implemented in the distributed base station unit and a fourth set of protocol functions are implemented in the central base station unit; and initiating a handover of the distributed base station unit from the first donor base station to the second donor base station.

The capacity of the connection between the central base station unit and the distributed base station unit via the second donor base station may be more than a capacity of a connection between the central base station unit and the distributed base station unit via the first donor base station, and the third set of protocol functions of the second functional split may include less functions than the first set of protocol functions of the first functional split and the fourth set of protocol functions of the second functional split may include more functions than the second set of protocol functions of the first functional split.

The method may further comprise: causing the second donor base station to increase a proportion of its overall resource dedicated to the distributed base station unit.

The capacity of the connection between the central base station unit and the distributed base station unit via the second donor base station may be less than a capacity of a connection between the central base station unit and the distributed base station unit via the first donor base station, and the third set of protocol functions of the second functional split may include more functions than the first set of protocol functions of the first functional split and the fourth set of protocol functions of the second functional split may include less functions than the second set of protocol functions of the first functional split. The handover may be initiated and completed before the centralized base station unit and distributed base station unit implement the second functional split.

The method may further comprise: configuring a reporting threshold of the distributed base station unit which, upon satisfaction, causes the distributed base station unit to prepare a measurement report, wherein the threshold is based upon the determined capacity of the connection.

The method may further comprise: configuring a reporting threshold of a UE of the first or second donor base station which, upon satisfaction, causes the UE to prepare a measurement report; and configuring a reporting threshold of the distributed base station unit which, upon satisfaction, causes the distributed base station unit to prepare a measurement report, wherein the reporting threshold of the distributed base station unit is based upon a relatively higher signal quality to the reporting threshold of the UE. The reporting threshold of the distributed base station unit may be further based upon the determined capacity of the connection.

The capacity of the connection between the central base station unit and the distributed base station unit via the second donor base station may be determined based on the capacity of the connection between the second donor base station and the distributed base station unit.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a network node for a cellular telecommunications network, the network node comprising a transceiver, memory and processor adapted to cooperate to implement the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
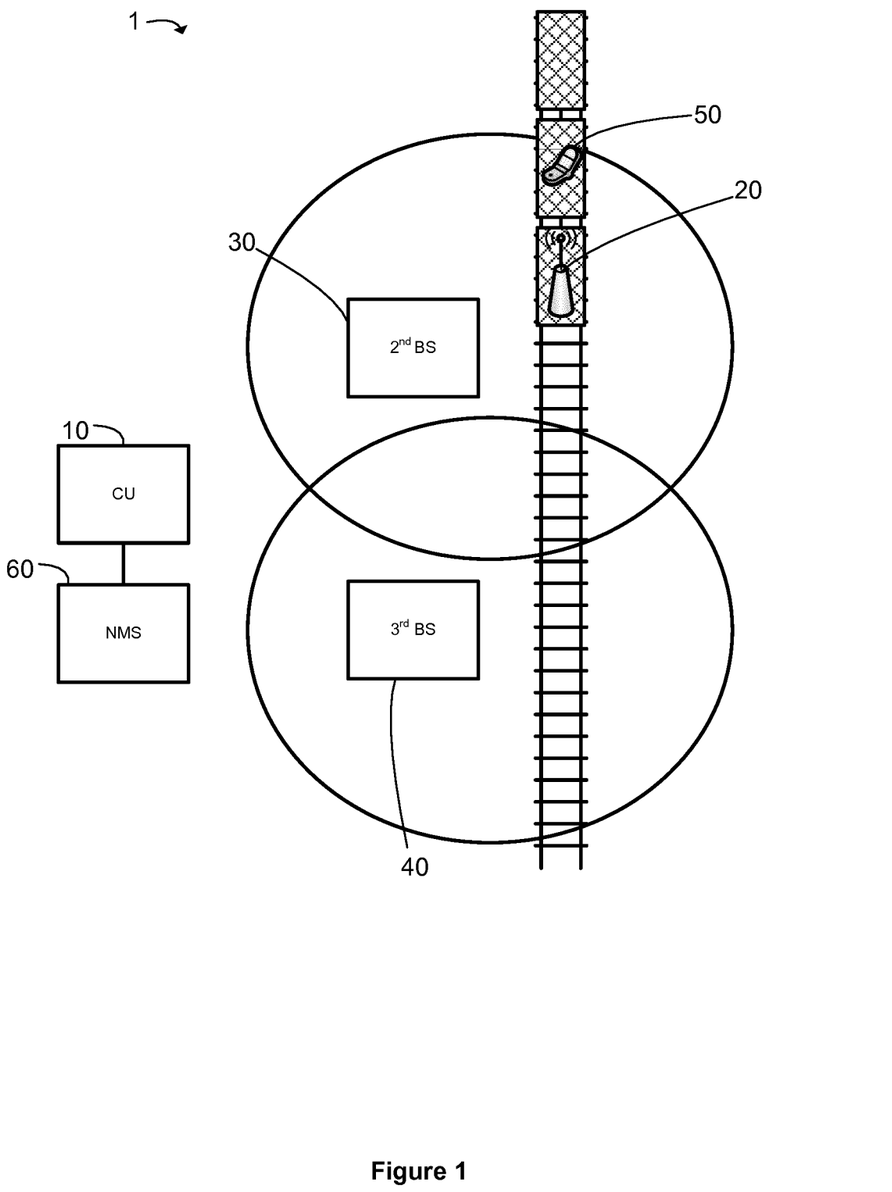
FIG. 1 is a schematic diagram of a cellular telecommunications network of an embodiment of the present disclosure.

A first embodiment of a cellular telecommunications network 1 will now be described with reference to FIGS. 1 to 3. The cellular network 1 includes a first base station having a central unit 10 and a first distributed unit 20. In this embodiment, the first distributed unit 20 is affixed to a movable train and serves a User Equipment (UE) 50. The first base station will typically have many other distributed units, but just one is shown for simplicity. FIG. 1 also illustrates a second and third base station 30, 40, which have a fixed geographical location and have coverage areas depicted by their respective enveloping ellipses, and a Network Management System (NMS) 60.

Figure 2:
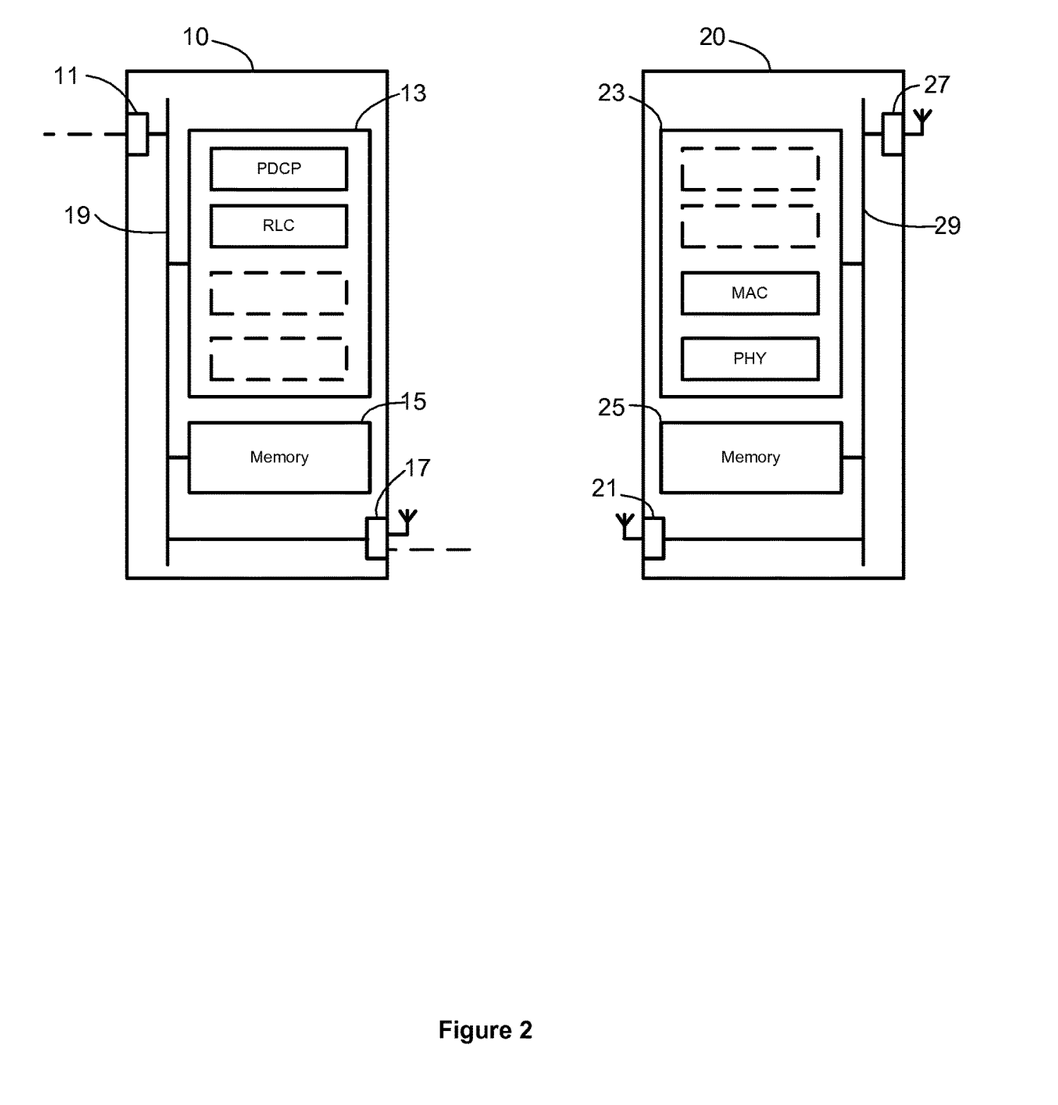
FIG. 2 is a schematic diagram of a central unit and first distributed unit of the network of FIG. 1.

FIG. 2 illustrates the first base station in more detail. As shown, the central unit 10 has a first transceiver 11, a processor 13, memory 15, and a second transceiver 17, all connected via bus 19. The first transceiver 11 is a wired communications interface such that the central unit 10 may communicate with one or more cellular core networking nodes (such as the NMS 60). In this embodiment, the second transceiver 17 uses both a wired and wireless communications interface. The wired communications interface connects the central unit 10 to one or more other distributed units (other than the first distributed unit 20), and the wireless communications interface connects the central unit 10 to both the second and third base stations 30, 40. The transceivers, processor and memory are configured to cooperate to define a Software Defined Networking (SDN) operating environment, allowing the central unit 10 to reconfigure on demand.

Furthermore, the first distributed unit 20 also includes a first transceiver 21 for wireless communication with the second or third base station 30, 40, a processor 23, memory 25, a second transceiver 27 for wireless communication with the UE 50, all connected via bus 29. Similarly, the transceivers, processor and memory are configured to cooperate to define a Software Defined Networking (SDN) operating environment, allowing the first distributed unit 20 to reconfigure on demand.

FIG. 2 also illustrates the processors of the central unit 10 and first distributed unit 20 implementing different functions of their operating protocol (which, in this embodiment, is the Long Term Evolution (LTE) protocol). The various functions of the LTE protocol are split between the respective processors 13, 23 of the central unit 10 and first distributed unit 20 such that the first distributed unit 20 implements the physical (PHY) function and Medium Access Control (MAC) function, and the central unit 10 implements the Radio Link Control (RLC) function, and Packet Data Convergence Control (PDCP) function. In doing so, the central unit 10 may coordinate transmissions of several distributed units to improve Quality of Service (QoS) in the cellular network 1.

The processors of the central unit 10 and first distributed unit 20 are able to reconfigure (as they operate SDN environments) to implement different functional splits, such as:
A) First Distributed Unit 20: PHY, Central Unit 10: MAC, RLC, PDCP;
B) First Distributed Unit 20: PHY, MAC, Central Unit 10: RLC, PDCP (as shown);
C) First Distributed Unit 20: PHY, MAC, RLC Central Unit 10: PDCP;

Furthermore, the central unit 10 and first distributed unit 20 may implement further functions (in which case further functional splits would be possible), but these four functions are illustrated for simplicity.

In this embodiment, the central unit 10 and first distributed unit 20 communicate via the second or third base station 30, 40. For example, the first distributed unit 20 may form a wireless connection with the second base station 30, and the second base station 30 may form a wireless connection with the central unit 10, and transmissions between the central unit 10 and first distributed unit 20 may then travel via the second base station and these two connections. In this manner, the second base station 30 becomes a "donor" base station to the first distributed unit 20.

Figure 3:
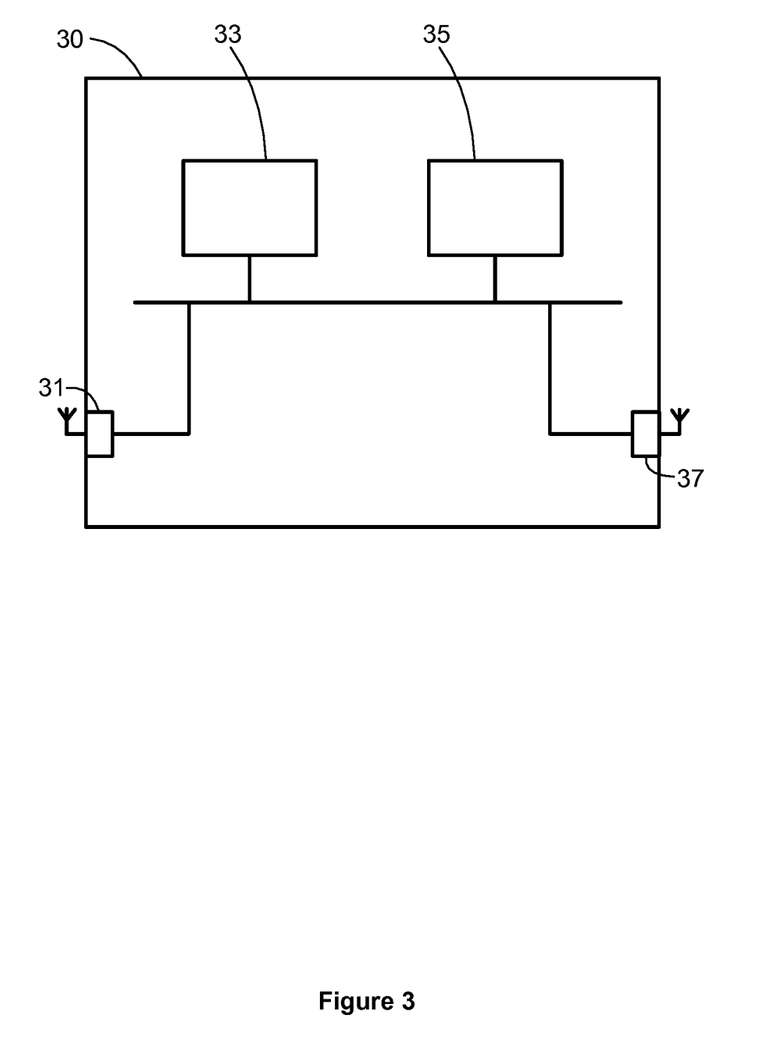
FIG. 3 is a schematic diagram of a donor base station of the network of FIG. 1.

FIG. 3 is a schematic diagram of the second base station 30. The second base station 30 includes a first transceiver 31, a processor 33, memory 35 and a second transceiver 37, all connected via bus 39. The second base station's first transceiver 31 is an antenna configured for communicating with the central unit's second transceiver 17, and may also be used to communicate with other base stations (e.g. the third base station 40) and core networking entities of the cellular network 1. The second transceiver 37 is an antenna configured for 1) communication with a plurality of User Equipment (UE), and 2) forming the donor connection with the first distributed unit 20. The third base station 40 is substantially similar to the second base station 30.

Figure 4A:
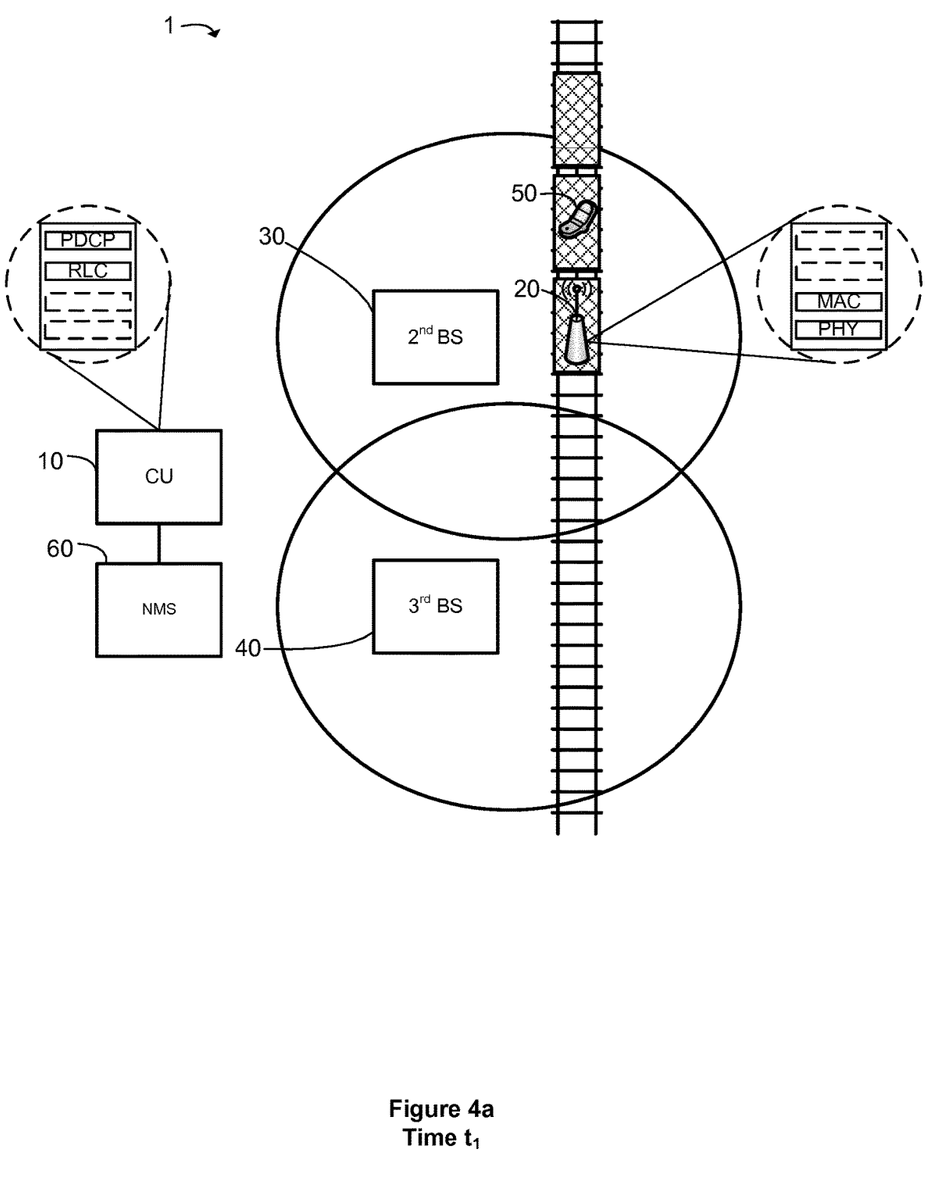
FIGS. 4a to 4d illustrate the cellular network of FIG. 1 as the first distribution unit moves between various positions.
Figure 4B:
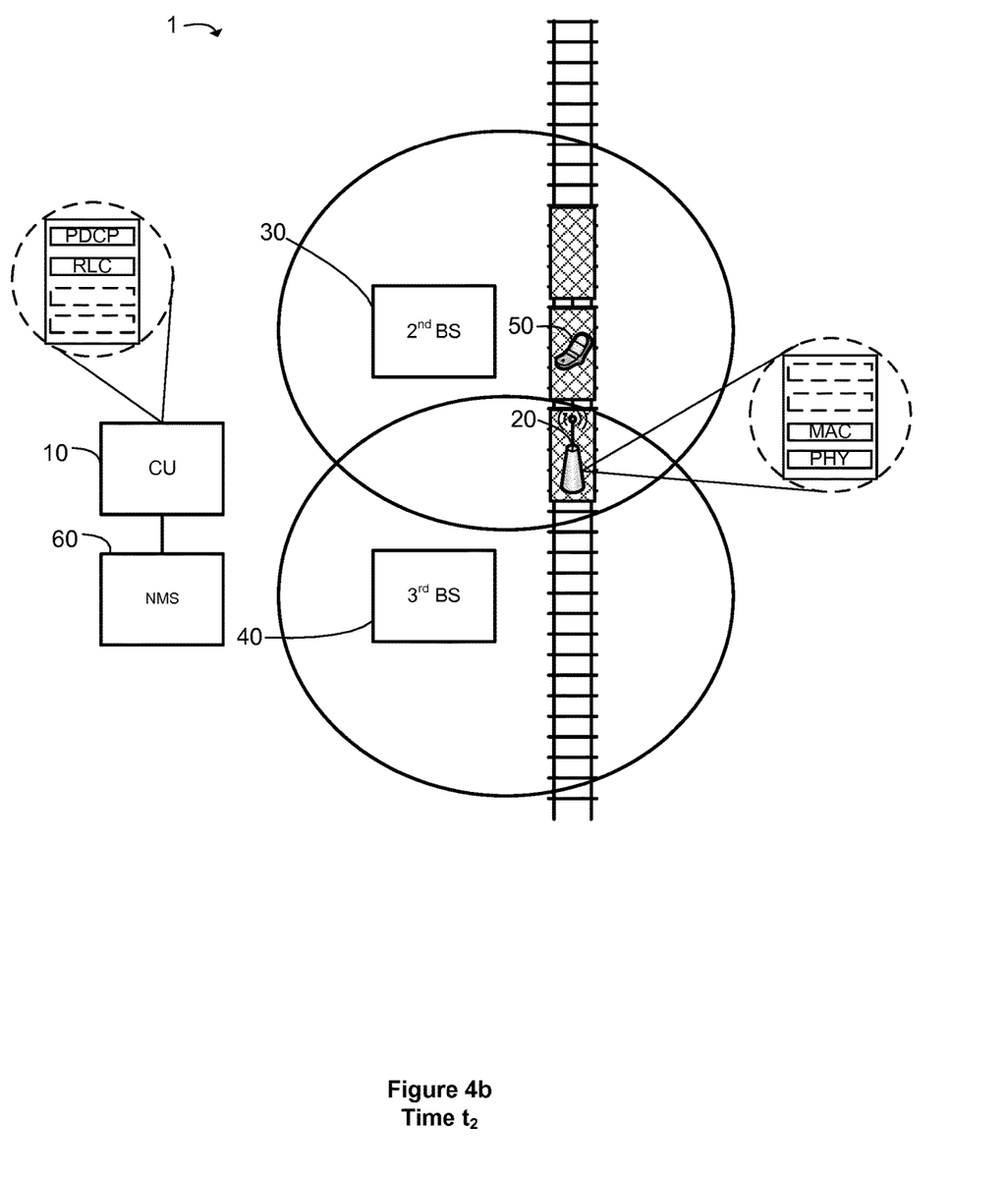
Figure 4C:
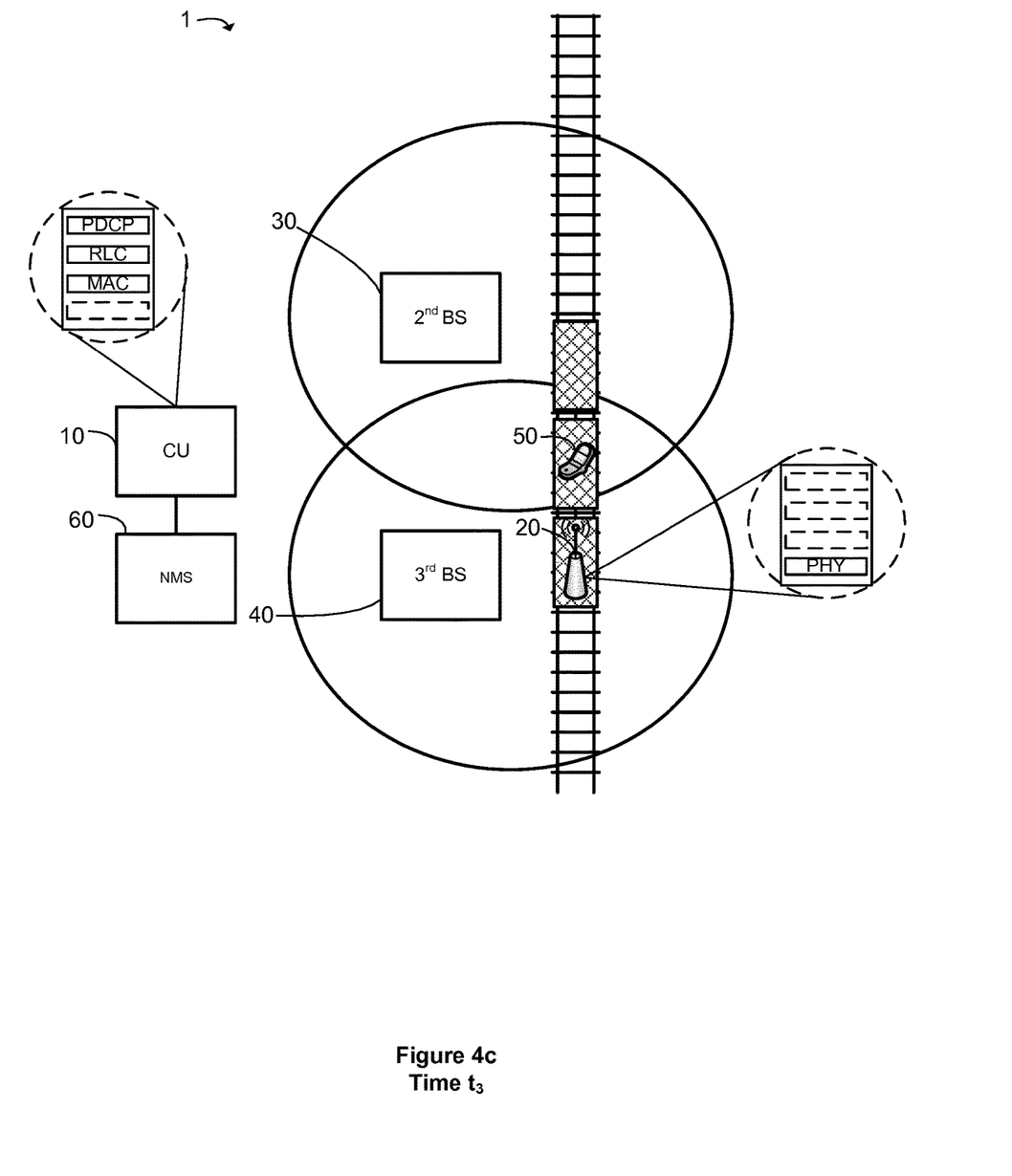

A first embodiment of a method of the present disclosure will now be described with reference to FIGS. 4a, 4b, 4c and 5. FIGS. 4a to 4c illustrate the cellular network 1 at three different times $t_1$, $t_2$, $t_3$, whereby the first distributed unit 20 is positioned at positions $p_1$, $p_2$ and $p_3$ respectively. The starting scenario for this embodiment is at time $t_1$ as shown in FIG. 4a, in which the first distributed unit 20 is in position $p_1$. The first distributed unit 20 is connected to the cellular core network via the central unit 10 and the second base station 30, such that the second base station 30 is the serving donor base station for the first distributed unit 20. All communications between the UE 50 and the cellular core network (and any other networks connected to the cellular core network, such as the Internet) are therefore via the connection from the UE 50 and the first distributed unit 20, the (donor) connection between the first distributed unit 20 and the second base station 30, the connection between the second base station 30 and the central unit 10, and the connection between the central unit 10 and the cellular core network.

In this first embodiment, the central unit 10 and first distributed unit 20 implement functional split B (as noted above and as shown in FIG. 4a) such that the first distributed unit 20 implements the PHY and MAC functions, and the central unit 10 implements the RLC and PDCP functions. The central unit 10 may also implement higher layer functions, but these are not shown for simplicity.

Figure 5:
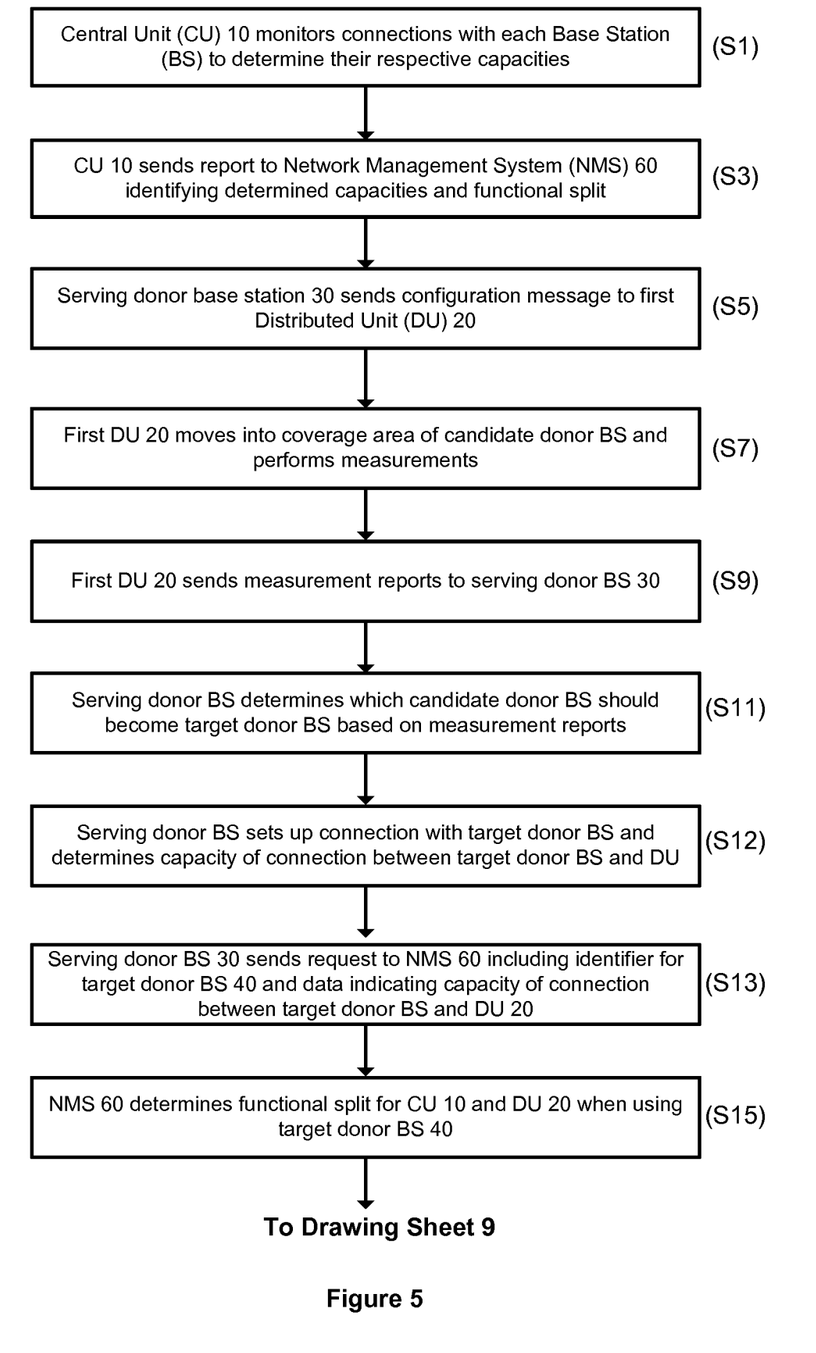
FIG. 5 is a flow diagram illustrating a method of embodiments of the present disclosure.

In S1 of the method of this first embodiment, as illustrated in the flow diagram of FIG. 5, the central unit 10 monitors its connections with each base station in the cellular network 1 to determine a capacity of the connection. In this scenario, this includes the central unit 10 monitoring its connection to the second base station 30 and its connection to the third base station 40 to determine their respective capacities. In S3, the central unit 10 sends a periodic report message to the NMS 60, including data indicating 1) the determined capacity of the central unit's connection with each base station, and 2) the functional split between the central unit 10 and the first distributed unit 20. The NMS 60 stores this data in memory.

In S5, the second base station 30 sends a configuration message to the first distributed unit 20 which sets various reporting thresholds for the first distributed unit 20 which, if met, are responded to by the first distributed unit 20 sending a measurement report to the second base station 30. For example, the threshold may indicate the Reference Signal Received Power (RSRP) threshold for reference signals from the second base station 30 and, if the RSRP of reference signals from the second base station 30 as measured by the first distributed unit 20 drop below this threshold, then the first distributed unit 20 responds by sending a measurement report to the second base station 30. This measurement report identifies other base stations that the first distributed unit 20 receives signals from, and further includes measurements of signals from these other base stations.

In this embodiment, these reporting thresholds for the first distributed unit 20 are set so that it is more likely that they will be triggered by the first distributed unit 20 (relative to the corresponding reporting thresholds used by UEs of the second base station). For example, the threshold for the RSRP of reference signals from the second base station 30 as measured by the first distributed unit 30 may be greater than the threshold for the RSRP of reference signals from the second base station 30 as measured by a UE of the second base station 30, such that it is more likely that this threshold will be met by the first distributed unit 20. The benefits of using such reporting thresholds will become clear upon review of the following description.

In S7, the first distributed unit 20 moves into position $p_2$ (as shown in FIG. 4b) in which a reporting threshold for the first distributed unit 20 to send a measurement report is met. In response, the first distributed unit 20 uses a Network Listen (NL) function to identify any base station that it receives signals from. In position $p_2$, the first distributed unit 20 is within the coverage area of the third base station 40 and so the first distributed unit 20 identifies and performs one or more measurements of the third base station 40. In S9, the first distributed unit 20 compiles and sends a measurement report to the second base station 30.

In S11, the second base station 30 determines which base station should be a donor base station for the first distributed unit 20 based on the measurement report. In this example, the second base station 30 determines that the third base station 40 should be the donor base station, such that the third base station 40 becomes the "target" donor base station.

In S12, the second base station 30 sets up an inter-base station connection (e.g. an X2 connection) with the third base station 40. The second base station 30 then requests capacity data from the third base station 40. The third base station 30 responds with this capacity data (e.g. information on its current load indicating how many resources are available to support the first distribution unit 20).

In S13, the second base station 30 sends a request message to the NMS 60 (via the central unit 10), the request message including an identifier for the third base station 40 and data indicating the capacity of the connection between the third base station 40 and the first distributed unit 20. In response, the NMS 60 retrieves the latest data indicating the capacity between the central unit 10 and the third base station 40 (from the periodic report message from the central unit 10 in S3). The NMS 60 then determines the capacity of an overall connection between the central unit 10 and first distributed unit 20 via the third base station 40, based on both the connection between the central unit 10 and the third base station 40 and the connection between the third base station 40 and the first distributed unit 20.

In S15, the NMS 60 determines a functional split for the central unit 10 and first distributed unit 20 based on the determined capacity of the overall connection between the central unit 10 and first distributed unit 20 via the third base station 40. In this embodiment, this is based on the following logic:

If capacity<x, then use functional split C;
If y>capacity>=x, then use functional split B;
If capacity>=y, then use functional split A.

In this embodiment, the NMS 60 determines that the central unit 10 and first distributed unit 20 should use functional split A. This is because the determined capacity of the overall connection has risen above threshold y, indicating that the connection can accommodate a lower functional split in which more functions are processed in the central unit 10 (such that the central unit 10 may improve coordination of transmissions from several distributed units). As the NMS 60 determines that the functional split is changing from B to A, due to an increase in capacity in the connection via the target donor base station compared to the connection via the source donor base station, the process continues to S17.

In S17, the NMS 60 sends a response message to the second base station 30 which indicates that the handover of the first distributed unit 20 to the third base station 40 may continue. In S19, the second base station 30 initiates the handover of the first distributed unit 20 to the third base station 40. Upon completion, the second base station 30 sends a notification to the NMS 60 that the handover is complete. In response, in S21, the NMS 60 sends 1) instruction messages to the central unit 10 and first distributed unit 20 indicating that they should reconfigure to use functional split A (as shown in FIG. 4c), and 2) an instruction message to the third base station 40 to increase the amount of resource dedicated to the first distributed unit 20. This second instruction message is beneficial as the resources allocated to the third base station's connection with the first distributed unit 20 during the handover only represent the resources required for functional split B but, as this is expected to increase following the change to functional split A, then this second instruction message pre-emptively solves this problem by causing more resources to be allocated to this connection.

The above embodiment illustrates a scenario in which the determined capacity of the overall connection between the central unit 10 and first distributed unit 20 via the third base station 40 increases (relative to the connection via the second base station 20). A second embodiment will now be described, with reference to FIGS. 4a, 4b, 4d and 5, in which this determined capacity decreases. S1 to S15 are the same in this embodiment, except the output of the determination in S15 is that the central unit 10 and first distributed unit 20 should use functional split C (as the determined capacity of the overall connection has dropped below x). The process then continues to S23.

Figure 4D:
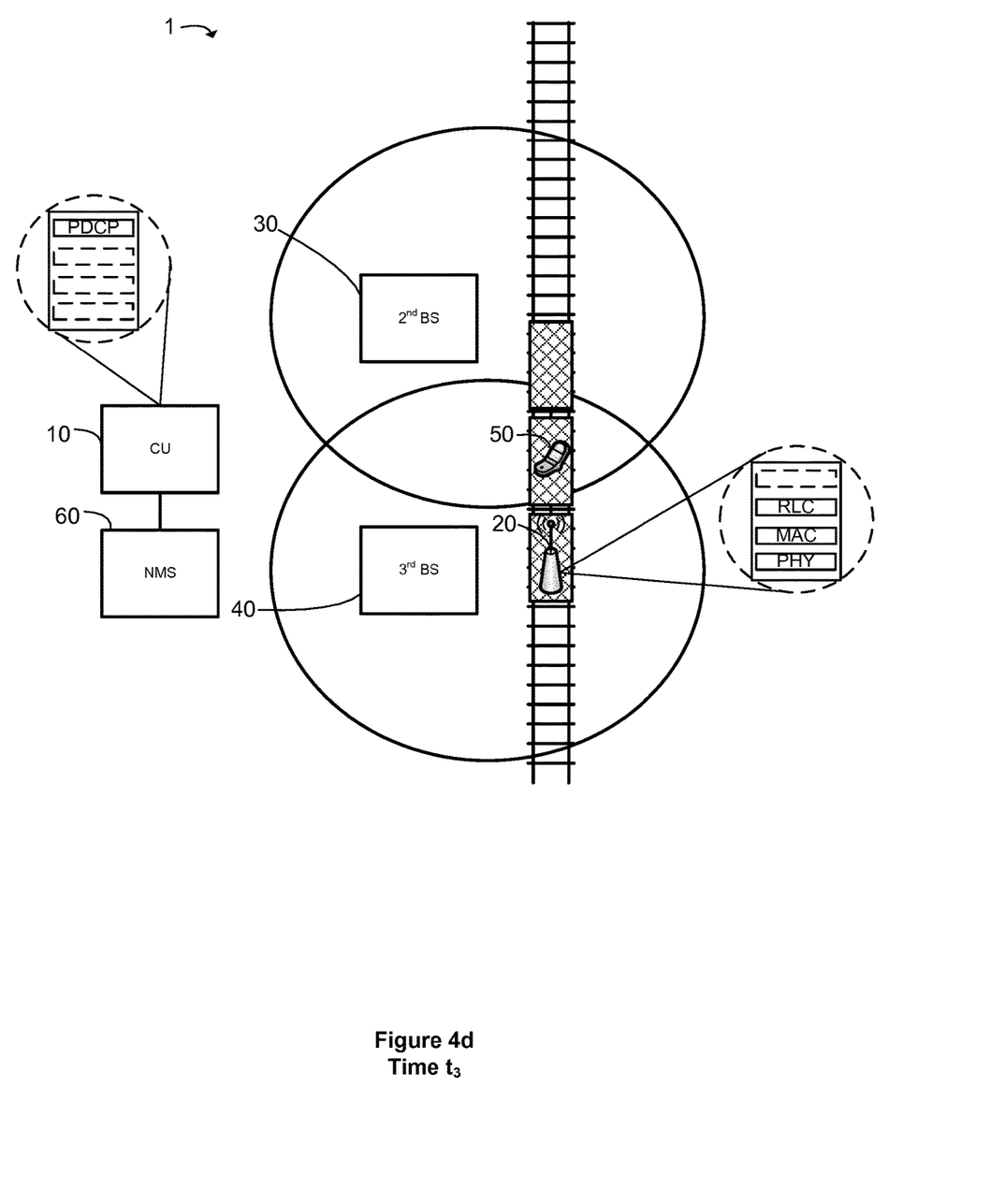

In S23, the NMS 60 sends instruction messages to the central unit 10 and first distributed unit 20 indicating that they should reconfigured to use functional split C. The central unit 10 and first distributed unit 20 respond by reconfiguring to use functional split C and, following reconfiguration, send a confirmation message to the NMS 60 confirming that the reconfiguration is complete. In S25, the NMS 60 receives this confirmation message and sends a response message to the second base station 30 which indicates that the handover of the first distributed unit 20 to the third base station 40 may continue. In S27, the second base station initiates the handover of the first distributed unit 20 to the third base station 40. As the central unit 10 and first distributed unit 20 have already reconfigured to use functional split C, then the connection between these two units via the third base station 40 already accommodates their resource demand. Following these steps, the central unit 10 and first distributed unit 20 are configured as shown in FIG. 4d.

Returning to FIG. 5, following completion of S17 to S21 (in which the capacity of the overall connection between the central unit 10 and first distributed unit 20 via the third base station 40 increases) or S23 to S27 (in which this capacity decreases), the method proceeds to S29. In S29, the third base station 40 sends a configuration message to the distributed unit 20 to set various reporting thresholds. These configuration messages are configured so that a handover from a source donor base station having a relatively higher capacity connection to a target donor base station having a relatively lower capacity connection sets a reporting threshold for the first distributed unit 20 that makes it more likely for the first distributed unit 20 to initiate a handover (and vice versa). This encourages the first distributed unit 20 to remain connected to a more suitable serving donor base station.

In an alternative embodiment, the determination of what functional split should be used by the target donor base station may be the same functional split that is currently being used by the source donor base station. In this scenario, the handover may proceed without any change in functional split.

In the above embodiments, the first base station is configured to adapt its functional split between its central unit 10 and first distributed unit 20 to implement different proportions of the overall set of functions of the protocol in use (LTE in the above example, although any other cellular/wireless communications protocol may be used). The skilled person will understand that whole layers of a protocol may be moved between the central unit and first distributed unit, or just a part (i.e. function) thereof. Furthermore, the distributed units may implement the RF functions of the protocol only, and all other functions may be implemented in the central unit.

The skilled person will also realize that determining which functional split the central unit 10 and first distributed unit 20 should use via the target donor base station is just an example, and other methods may be used. Firstly, other factors may be used in addition to the capacity of the connection, such as latency, jitter, and synchronization support. Furthermore, the capacity of the connection may include both the downlink and uplink capacities as factors. The following table sets out various thresholds which may be used to determine which function split to use:

| Protocol Split | Max. Latency | DL Capacity | UL Capacity |
| --- | --- | --- | --- |
| PDCP-RLC | 30 ms | 151 Mbps | 48 Mbps |
| RLC-MAC | 6 ms | 151 Mbps | 48 Mbps |
| MAC-MAC | 6 ms | 151 Mbps | 49 Mbps |
| MAC-PHY | 0.25 ms | 152 Mbps | 49 Mbps |
| PHY-PHY I | 0.25 ms | 173 Mbps | 452 Mbps |
| PHY-PHY II | 0.25 ms | 933 Mbps | 903 Mbps |
| PHY-PHY III | 0.25 ms | 1075 Mbps | 922 Mbps |

In an enhancement, these threshold may be dynamic such that the NMS 60 receives feedback on previous functional split reconfigurations indicating whether the reconfiguration was successful or not. In this sense, a successful reconfiguration may be determined as one that does not result in the target base station becoming overloaded immediately or shortly after handover of the distributed unit to the target donor base station. Using such feedback, the NMS 60 may alter one or more thresholds such that future functional reconfigurations are more likely to be successful.

In the above embodiments, the capacity of the connection was determined between the central unit and the first distributed unit via the target donor base station. However, the skilled person will understand that the benefits of the invention may be realized by only using a part of this connection (such as the link between the target donor base station and the first distributed unit). Furthermore, it is non-essential for the capacity of the connection between the target donor base station and the first distributed unit to be determined by the serving and target donor base stations exchanging messages.

In an alternative arrangement, the first distributed unit may include suitable measurements of the target donor base station in its measurement report which allow the capacity to be determined or estimated. This may include the RSRP of signals between the target donor base station and the first distributed unit, or load information of the target donor base station.

In the above embodiments, the reporting thresholds for the first distributed unit are set so that it is more likely that they will be met as compared to those used for UEs of the serving base station. For example, the reporting threshold for the first distributed unit may use a relatively higher signal quality (e.g. higher RSRP) to the reporting threshold for the UE. In doing so, there is a greater amount of time between a handover of the first distributed unit to a target base station in order for the functional split change to be effected.

In the above embodiments, an NMS makes the determination on whether a functional split change should be made. However, the skilled person will understand that other nodes in the cellular network may implement these steps, including the source donor base station or the central unit.

The skilled person will also understand that the above embodiments may be performed independently for uplink and downlink communications between the central unit and distributed unit.

The skilled person will understand that any combination of features is possible within the scope of the invention, as claimed.

The invention claimed is:

1. A method in a cellular telecommunications network, the cellular telecommunications network including a central base station unit, a first donor base station and a distributed base station unit, the central base station unit having a first interface for communicating with a first cellular core networking node and a second interface for communicating with the first donor base station, the first donor base station having a first interface for communicating with the central base station unit and a second interface for wirelessly communicating with the distributed base station unit, the distributed base station unit being mobile and having a first interface for wirelessly communicating with the first donor base station and a second interface for communicating with a User Equipment (UE) wherein user traffic of the UE is transmitted between the central base station unit and the UE via the first donor base station and the distributed base station unit, wherein the central base station unit and the distributed base station unit implement a first functional split in which a first set of protocol functions are implemented in the distributed base station unit and a second set of protocol functions are implemented in the central unit, the method comprising:
    discovering a second donor base station having a first interface for communicating with the first central base station unit and a second interface for wirelessly communicating with the distributed base station unit;
    determining a capacity of a connection between the central base station unit and the distributed base station unit via the second donor base station;
    determining that the capacity of the connection satisfies a functional split threshold; and, in response to this determination,
    causing the centralized base station unit and the distributed base station unit to implement a second functional split in which a third set of protocol functions are implemented in the distributed base station unit and a fourth set of protocol functions are implemented in the central base station unit; and
    initiating a handover of the distributed base station unit from the first donor base station to the second donor base station.

2. The method as claimed in claim 1, wherein the capacity of the connection between the central base station unit and the distributed base station unit via the second donor base station is more than a capacity of a connection between the central base station unit and the distributed base station unit via the first donor base station, and the third set of protocol functions of the second functional split includes less functions than the first set of protocol functions of the first functional split and the fourth set of protocol functions of the second functional split includes more functions than the second set of protocol functions of the first functional split.

3. The method as claimed in claim 2, further comprising causing the second donor base station to increase a proportion of an overall resource dedicated to the distributed base station unit.

4. The method as claimed in claim 1, wherein the capacity of the connection between the central base station unit and the distributed base station unit via the second donor base station is less than a capacity of a connection between the central base station unit and the distributed base station unit via the first donor base station, and the third set of protocol functions of the second functional split includes more functions than the first set of protocol functions of the first functional split and the fourth set of protocol functions of the second functional split includes less functions than the second set of protocol functions of the first functional split.

5. The method as claimed in claim 4, wherein the handover is initiated and completed before the centralized base station unit and the distributed base station unit implement the second functional split.

6. The method as claimed in claim 1, further comprising configuring a reporting threshold of the distributed base station unit which, upon satisfaction, causes the distributed base station unit to prepare a measurement report, wherein the reporting threshold is based upon the determined capacity of the connection.

7. The method as claimed in claim 1, further comprising:
    configuring a reporting threshold of a UE of the first donor base station or the second donor base station which, upon satisfaction, causes the UE to prepare a measurement report; and
    configuring a reporting threshold of the distributed base station unit which, upon satisfaction, causes the distributed base station unit to prepare a measurement report, wherein the reporting threshold of the distributed base station unit is based upon a relatively higher signal quality than the reporting threshold of the UE.

8. The method as claimed in claim 7, wherein the reporting threshold of the distributed base station unit is further based upon the determined capacity of the connection.

9. The method as claimed in claim 1, wherein the capacity of the connection between the central base station unit and the distributed base station unit via the second donor base station is determined based on the capacity of the connection between the second donor base station and the distributed base station unit.

10. A non-transitory computer-readable storage medium storing a computer program product comprising instructions which, when the program is executed by a computer, cause the computer to carry out the method of claim 1.

11. A network node for a cellular telecommunications network, the network node comprising a transceiver, memory and a processor adapted to cooperate to implement the method of claim 1.

* * * * *